Oct. 7, 1924.

J. S. TOWERS 1,511,147

SIDE WHEEL ATTACHMENT FOR CYCLES

Filed July 21, 1922

Inventor
J. S. Towers,

By
Attorney

Patented Oct. 7, 1924.

1,511,147

UNITED STATES PATENT OFFICE.

JOHN S. TOWERS, OF RAPID CITY, MICHIGAN.

SIDE-WHEEL ATTACHMENT FOR CYCLES.

Application filed July 21, 1922. Serial No. 576,422.

*To all whom it may concern:*

Be it known that JOHN S. TOWERS, a citizen of the United States of America, residing at Rapid City, in the county of Kalkaska and State of Michigan, has invented new and useful Improvements in Side-Wheel Attachments for Cycles, of which the following is a specification.

The object of the invention is to provide a simple and efficient side wheel attachment for bicycles, motor-cycles and like two-wheeled vehicles as a means for facilitating the following of tracks such as those of four-wheeled vehicles on country roads and the like to avoid traversing the otherwise rough and broken surface of the road without requiring the riding skill which is necessary in guiding a two-wheeled vehicle; and with this object in view the invention consists in a construction and combination of parts of which a preferred embodiment is shown in the accompanying drawings, wherein.

Figure 1:
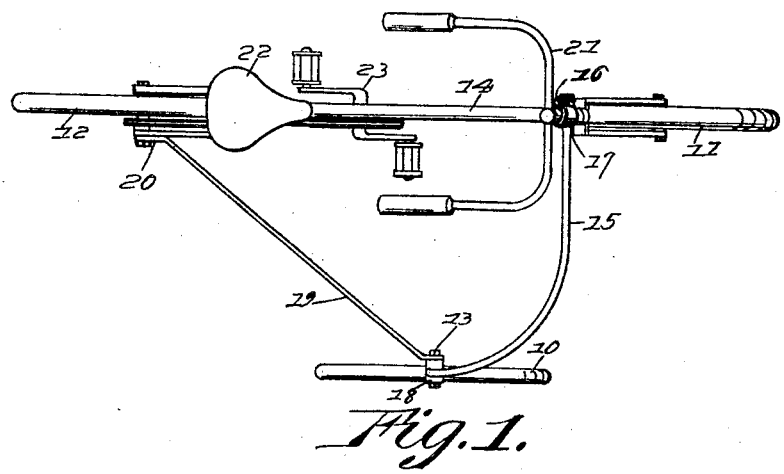
Figure 1 is a plan view.
Figure 2:
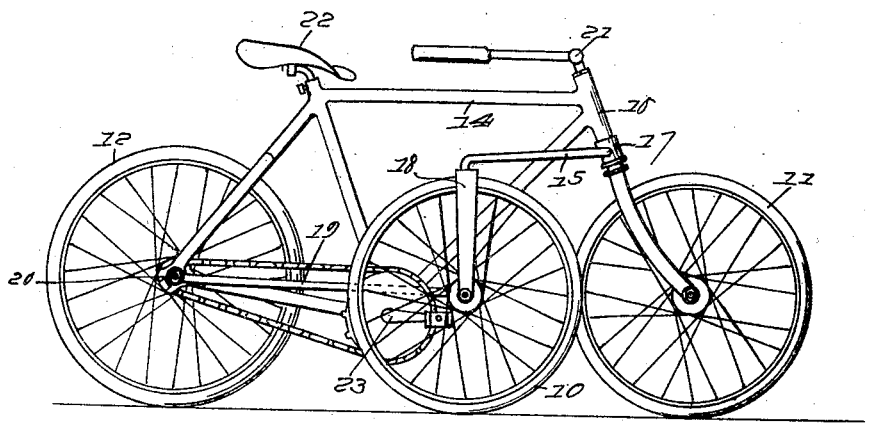
Figure 2 is a side view of a vehicle attachment constructed in accordance with the invention.

The device consists essentially of an auxiliary or side wheel 10 arranged in axial parallelism with the front and rear wheels 11 and 12 of a two-wheeled vehicle of the bicycle or motor-cycle type, and connections between the spindle 13 of said auxiliary side wheel and the frame 14 of the vehicle, so that the side wheel is spaced from the path of the vehicle wheels a distance corresponding with the interval between the tracks of a conventional four-wheeled vehicle to the end that when the vehicle wheels are traversing one track the auxiliary or guide wheel 10 will traverse the other track and enable the rider to follow the wagon tracks with accuracy and ease and thus make time with the minimum of vibration of the vehicle which is impossible with the ordinary conventional form of two-wheeled vehicle except by the exercise of a considerable amount of skill and with the constant risk of deflection and consequent accident.

In the construction illustrated the connection between the vehicle frame and the side wheel consists of an arm 15 extending laterally from the front or fork tube 16 of the vehicle frame, to which it may be attached by means of a clamp 17 or its equivalent and provided with a fork 18 carrying the side wheel spindle 13 with the wheel operating in the space between the elements of the fork, and a rear brace 19 extending diagonally from the inner end of the side wheel spindle to the spindle 20 of the rear vehicle 12. The terminals of said brace may be provided with eyes for engagement with the said spindles to which they may be secured by the usual nuts which serve to hold the spindles in place.

The side wheel supporting frame, consisting as above outlined of the lateral arm and rear brace are thus located respectively in advance and in rear of the steering handle 21 and saddle 22 between which the operating mechanism, consisting in the construction illustrated of the pedals 23, is located, and the brace is located in such a depressed plane with relation to the saddle as not to interfere in any way with the mounting and dismounting of the rider or with his operations while the machine is in motion, while the front arm 15 which is disposed in a more elevated plane by reason of its attachment to the fork bearing tube of the vehicle frame serves to effectively guide the side wheel and hold it against undue vibration while the machine is in operation, and at the same time serve as a guard or fender in the event of encountering an obstacle which can not be completely avoided, and which is preferably curved or arched as indicated in plan to more effectively perform its function in this respect.

Having described the invention, what is claimed as new and useful is:—

A side wheel attachment for vehicles of the two-wheeled type having a side arm extending laterally from the frame of the vehicle and provided with a terminal fork for supporting the spindle of the side wheel, and a rearwardly directed diagonal brace between the outer end of said arm and the rear portion of the vehicle frame, said brace being disposed substantially in the plane of the axis of said side and vehicle wheels, and being terminally attached respectively to the spindles thereof.

In testimony whereof he affixes his signature.

JOHN S. TOWERS.